United States Patent

Ahn

[15] 3,639,167

[45] Feb. 1, 1972

[54] TRANSITION METAL DOPED EUO FILMS

[72] Inventor: Kie Y. Ahn, Bedford, N.Y.

[73] Assignee: International Business Machines Corporation, Armonk, N.Y.

[22] Filed: Nov. 13, 1969

[21] Appl. No.: 876,404

[52] U.S. Cl. ....................117/240, 117/107.2, 117/123 A, 117/124 A, 117/127, 117/169 R, 117/235, 252/62.51, 252/62.55

[51] Int. Cl. ....................H01f 10/02

[58] Field of Search ....................117/235–240, 169 R, 117/169 A, 123 A, 124 A, 127, 107.2; 252/62.51, 62.55

[56] References Cited

UNITED STATES PATENTS

| | | | |
|---|---|---|---|
| 3,234,494 | 2/1966 | Matthias | 252/62.51 X |
| 3,399,957 | 9/1968 | Shafer | 252/62.51 X |
| 3,418,036 | 12/1968 | Holtzberg et al. | 252/62.51 X |
| 3,488,286 | 1/1970 | Holtzberg et al. | 252/62.51 |

*Primary Examiner*—William D. Martin
*Assistant Examiner*—Bernard D. Pianalto
*Attorney*—Hanifin and Jancin and Hansel L. McGee

[57] ABSTRACT

There is disclosed a ferromagnetic article of manufacture comprising a crystalline EuO film disposed on a substrate such as glass and quartz. The film is doped with a metal selected from Fe, Co, Ni and Cr. The doped film has an increased Curie temperature of about 180° K., its optical absorption peak occurs at about 5,800 A. and has a sharply increased absorption coefficient of about $2.4\times10^5$/cm. The article also has a high-magneto-optic Faraday rotation at higher temperatures.

Fabrication of the article is by the simultaneous vacuum evaporation of Eu, $Eu_2O_3$ and an inner transition metal.

12 Claims, 8 Drawing Figures

INVENTOR
KIE Y. AHN

BY Hansel L. McGee
ATTORNEY

TRANSITION METAL DOPED EUO FILMS

BACKGROUND OF THE INVENTION

1. Field of the Invention

This invention relates generally to EuO films having magneto-optic and ferromagnetic properties and a method for preparing the same; more specifically it relates to EuO films doped with inner transition metals and to the application thereof in a beam-addressable memory.

2. Description of the Prior Art

In computer technology and other technical arts, there is need for films of material having large magneto-optical effects. In particular, there is presently considerable interest in developing a film primarily of EuO for use in memory applications in computer technology. This use is commonly termed a beam-addressable memory, as both light beams and electron beams are utilizable for addressing the memory. For the memory, discrete magnetic regions in the film are established in preferred magnetic orientations by selectively heating them either with a laser beam or with an electron beam. A selected orientation is identified through the manner in which a polarization property of incident light is altered during interaction with a particular magnetic region. The rare-earth oxide EuO has been considered to have a desirable characteristic for such a memory application. However, the operational limitations imposed by the requirement to operate at especially low temperatures, in the order of less than 10° K., has severely inhibited the expansion of the beam-addressable memory application based upon an application of EuO film. This is because the Curie temperature of EuO is approximately 70° K., and it is necessary to operate at the lower temperatures to obtain the high magnetizations. It has been apparent for some time that were a film primarily of EuO available which could operate at temperature of 77° K. (readily obtainable through use of liquid nitrogen), it would cause rapid involvement of such films in computer technology.

In copending Pat. application, Ser. No. 749,505, now U.S. Pat. No. 3,488,286 by F. Holtzberg, et al., "Method of Producing High Curie Temperature EuO Single Crystals," filed on Aug. 1, 1968 and assigned to assignee hereof, there is presented data on the effect of a rare-earth sesquioxide inclusion in bulk EuO on the ferromagnetic Curie temperature. Illustratively, the ferromagnetic transition temperature $T_c$ of bulk EuO is described in the noted copending application as being increased from 69° K. to 140° K. by reacting Eu, EuO, and the rare-earth sesquioxide, e.g., $Gd_2O_3$. The ferromagnetic Curie temperature is a particular temperature above which ferromagnetism disappears.

Similarly, in copending Pat. application, Ser. No. 668,289, now U.S. Pat. No. 3,539,382 by Kie Y. Ahn, et al., "Film of Magneto-Optical Rare Earth Oxide Including a Method Therefor and Beam Addressable Memory Therewith," filed on Sept. 8, 1967 and assigned to the assignee hereof, there is presented data on the effect of a rare-earth sesquioxide inclusion in thin-film EuO on the ferromagnetic Curie temperature. Illustratively, the ferromagnetic transition temperature ($T_c$) of EuO films is described in the noted copending application as being increased from 69° K. to about 140° K.

It is an object of this invention to provide a ferromagnetic film, primarily of EuO, doped with a member of the group Fe, Co, Ni and Cr having relatively large magneto-optical effects and a relatively high ferromagnetic Curie temperature and method of fabrication thereof.

It is another object of this invention to provide a doped EuO film having crystalline structure with a Curie point relatively higher than that of the comparable nondoped and rare-earth doped film.

It is another object of this invention to provide a doped EuO film having ferromagnetic property capable of altering the polarization property of incident light when reflected or transmitted via a magnetized region of the film.

It is another object of this invention to provide a film primarily of rare-earth oxide characterized as a host crystalline lattice of EuO wherein the magneto-optical and ferromagnetic properties suitable for light response are modified by the presence of a dopant. The dopant specie include a plurality of different members of the transition metal group Fe, Co, Ni and Cr.

The foregoing and other objects, features, and advantages of the invention will be apparent from the following more particular description of preferred embodiments of the invention, as illustrated in the accompanying drawings.

SUMMARY OF THE INVENTION

Figure 1:
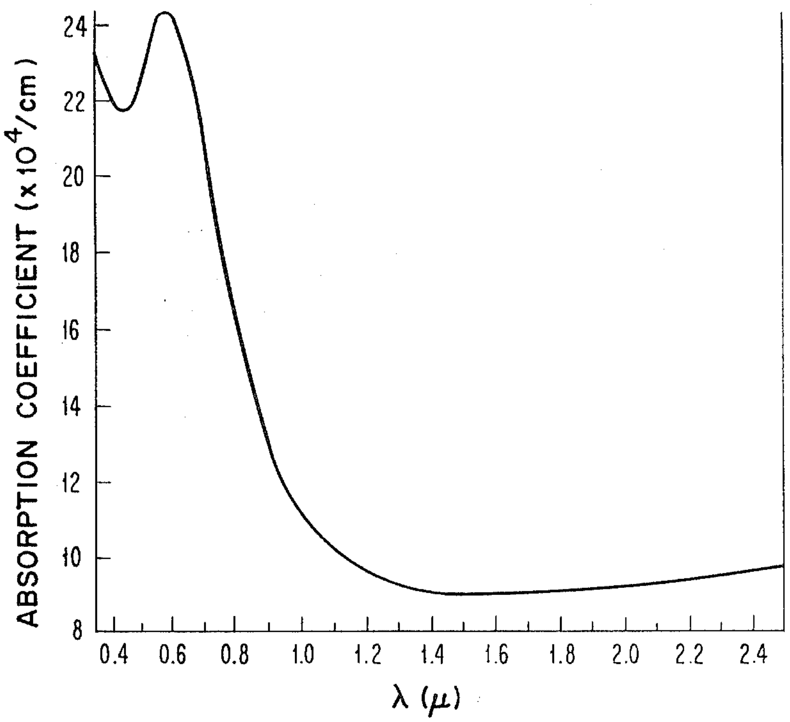
FIG. 1 is a schematic diagram illustrating a room-temperature optical absorption curve for an Fe-doped EuO film having a Curie temperature of 180° K.

A film according to this invention has magneto-optic and ferromagnetic properties and is responsive to incident light to alter an optical property thereof. The film is supported on a substrate such as quartz, glass or metal plate. It is primarily composed of divalent europium oxide containing a relatively small percent of a dopant selected from the group consisting of Fe, Co, Ni and Cr. Prepared films having one of the above-mentioned dopants in atomic relationship to Eu in the range of about 0.1 percent to about 30 percent by weight, increases the Curie temperature ($T_c$) of the film to as high as 180° K. The deposited films can be polycrystalline or single-crystalline.

DESCRIPTION OF PREFERRED EMBODIMENTS

In preferred embodiments of the invention, EuO films doped with an inner transition metal such as Fe, Co, Ni and Cr are prepared by the simultaneous vacuum evaporation of the components Eu, $Eu_2O_3$ and the selected dopant. The films are evaporated onto a heated substrate maintained at a temperature between 100° C. and 200° C. Typical substrates are glass, quartz, and polished metal plates. The evaporation is performed in a conventional vacuum evaporation system containing a source of $Eu_2O_3$, a source of the transition metal of choice, and a crucible containing Eu metal. The sources of $Eu_2O_3$ and transition metal are heated by individual electron guns. The crucible is heated conventionally. The films are prepared in a vacuum in the range of $8\times10^{-8}$ Torr to about $2\times10^{-5}$ Torr during evaporation, although the initial pressure is about $5\times10^{-}$Torr. Evaporation is typically carried out at a rate of about 20 A./sec. to about 30 A./sec. for source-to-substrate distance of about 30 cm.

The evaporation rates of the three sources are monitored by a 4.1 mHz. crystal oscillator and a frequency counter. The evaporation rate of Eu is first established by setting the input power to the crucible at about 240 watts. The instantaneous evaporation rate $\Delta f_{Eu}/\Delta t$ is monitored by the frequency counter with a gating time of 2 seconds. A change in the oscillator frequency, which is proportional to the thickness of the growing film, is recorded by an $x$–$y$ recorder having a time base. Once the evaporation rate of Eu is established, the transition metal source is caused to evaporate by turning on the electron beam gun associated therewith. The rate is adjusted by noting $\Delta_{Eu+metal}/\Delta t$. The input power to the electron guns is supplied by a constant voltage supply and can be held within about 10 percent of the initial settings. Lastly, the electron gun associated with the $Eu_2O_3$ source is turned on causing $Eu_2O_3$ to be evaporated. The evaporation rate of $Eu_2O_3$ is adjusted by noting the difference between $$\Delta f_{\mathrm{Eu+metal+Eu_2O_3}}/\Delta t$$

and $\Delta f_{Eu+metal}/\Delta t$. Film thicknesses are measured by a multiple-beam interferometer. Films having a thickness range of about 300 A. to about 50,000 A. are prepared. However, for a beam-addressable memory, a thin film is preferable, of thickness of the order of about 1,000 A. to about 4,000 A. The EuO films prepared by the above generally described method are found to have dopants present in the concentration range of about 0.1 percent to about 30 percent by weight of the film. The dopant, i.e., Fe, Co, Ni or Cr metal ions can be situated in sites in the crystal lattice vacant of Eu-- or it can be situated interstitially therein.

Further background information concerning evaporation onto a substrate of a plurality of components is presented in U.S. Pat. No. 3,427,154, issued Feb. 11, 1969 to S. R. Mader, et al., "Amorphous Alloys" and assigned to the assignee hereof.

As an illustrative example of the preferred embodiments of this invention, there is described hereinafter a method of preparing Fe-doped EuO films and the properties thereof. While the example is specific to the use of Fe as the dopant, it should be realized that EuO films in which Co, Ni and Cr are the dopants are similarly prepared.

Europium metal, $Eu_2O_3$, and Fe are simultaneously evaporated in a vacuum of about $2\times10^{-5}$ Torr in a conventional vacuum evaporating apparatus. The evaporating rate is maintained at about 30 A./sec. for a source-to-substrate distance of about 30 cm. The Eu to $Eu_2O_3$ ratio is maintained at about 0.6 to 1.5. The evaporation is permitted to continue for a time sufficient to deposit Fe-doped EuO films of about 1,700 A. thickness on substrates of glass and quartz. The resulting films were found to contain about 8 percent Fe by X-ray and chemical analysis. Other EuO films having different concentrations of Fe were similarly prepared and found to have different Fe concentrations and are illustrated in the ensuing table along with some measured properties such as, total absorption ($\alpha$), the absorption peaks and Curie temperatures.

TABLE I

| % Fe By Weight | Total $\alpha$ ($\times 10^5$/cm.) | $Eu/Eu_2O_3$ | Absorption Peak (A.) | $T_c$(°K.) |
|---|---|---|---|---|
| 7.7 | 2.4 | 1.3 | 5,800 | 180 |
| 6.8 | 2.2 | 1.3 | 5,700 | 180 |
| 5.8 | 2.2 | 1.2 | 5,850 | 165 |

Optical measurements were made on the films on a Cary 14 spectrophotometer and are room-temperature values. The absorption was scanned in the wavelength region from 0.3 $\mu$ to 2.5 $\mu$ with respect to a reference or (blank) substrate. As seen in table I above and in FIG. 1, the film containing about 7.7 percent Fe has a total absorption about $2.4\times10^5$/cm. This should be compared with pure EuO and rare-earth-doped EuO films of above-mentioned patent application, Ser. No. 749,505, which are found to have an absorption of $1.5\times10^5$ /cm. respectively. This increased absorption of the Fe-doped EuO film has the advantage of providing higher efficiency in thermowriting techniques.

It is seen from the above table that the Curie temperature ($T_c$) varies with the concentration of Fe. Further increases in $T_c$ are expected by optimizing the evaporation parameter such as the ratio of $Eu/Eu_2O_3$ and the concentration of Fe.

Figure 2:
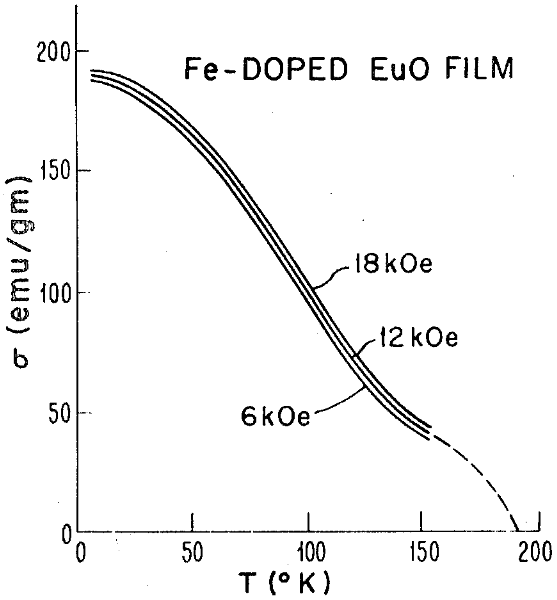
FIG. 2 presents graphs of measurements of magnetic moment versus temperature of a Fe-doped EuO film at three levels of applied field.
Figure 3:
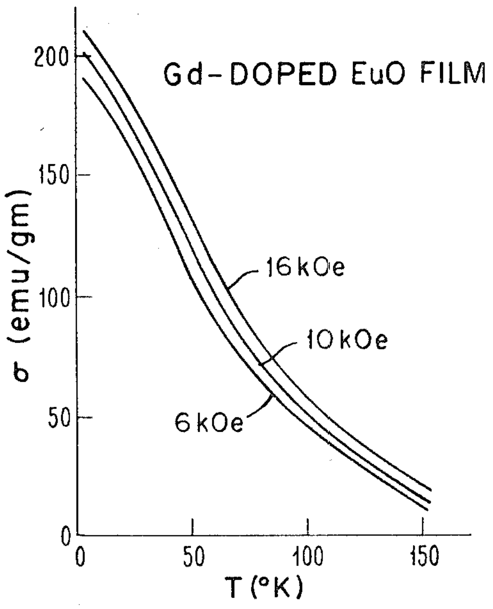
FIG. 3 presents graphs of measurements of magnetic moment versus temperature for a Gd-doped EuO film at three levels of applied field useful for comparison with FIG. 2.

High-field magnetic moments are measured on samples deposited on quartz in the temperature range of about 4.2° K. to about 150° K. using fields up to 18 K. Oe applied in the plane of the substrate. The temperature dependence of the moment of a film of about 1,700 A. thickness containing 7.7 percent of Fe is shown in FIG. 2. At 12 K. Oe the moment ($\sigma$) is about 190 emu/gm. as compared with 225 emu/gm. for pure EuO. The loss of moment is thought to be attributable to Fe, surface oxide layer, and some second-phase materials at the grain boundaries. It is particularly worth noting that at 77° K. $\sigma$ is about 125 emu/gm., or approximately 65 percent of the low-temperature value. $T_c$ is extrapolated to be about 180° K. FIG. 2 is compared with a similar curve (shown in FIG. 3) for Gd-doped EuO film indicated as FIG. 2 in the above-mentioned copending patent application, Ser. No. 668,289. As indicated above, at 77° K. for the Fe-doped film, the moment is about 125 emu/gm. as compared to a moment of about 65 for the Gd-doped film. This comparison indicates that the amount of signal available to the Fe-doped film is about twice that of the Gd-doped film at 77° K., thus indicating the Fe-doped film as being superior in magnetic property.

Figure 4:
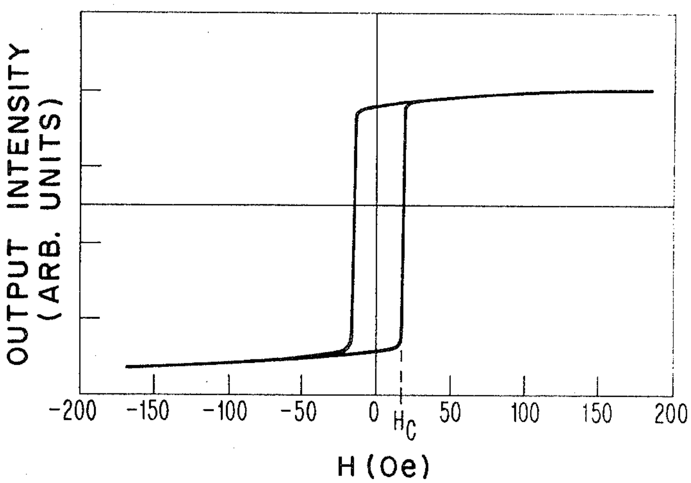
FIG. 4 is a line diagram of a typical hysteresis loop of an Fe-doped EuO film at 77° K.
Figure 5:
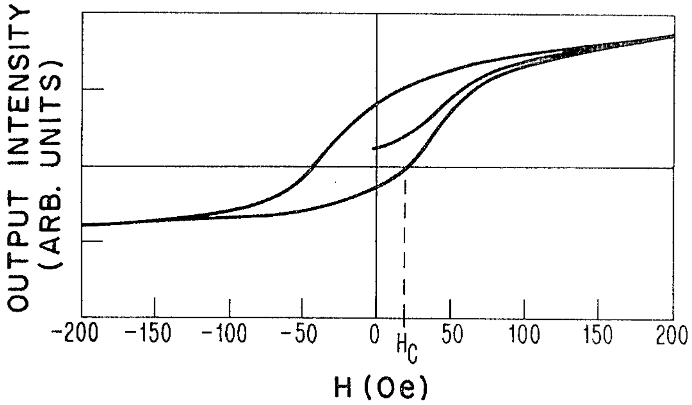
FIG. 5 is a line diagram of a typical hysteresis loop of an Gd-doped EuO film at 77° K., to be compared with FIG. 4.

The quasistatic switching properties of the films were measured by using longitudinal Faraday rotation in an optical dewar in the temperature range between 9° K. and 180° K. The experimental apparatus consists of a monochromator, a light copper, a pair of Glan-Thompson prisms, a pair of coils, photomultiplier tubes, a phase-sensitive amplifier-detector, and a storage oscilloscope At low temperature, e.g., 9° K., the coercive force of films of about 1,700 A. thickness varies from 33 Oe on glass to 70 Oe on quartz. The dependence of coercive force on substrate material is similar to the previously mentioned Gd-doped EuO films of copending patent application, Ser. No. 668,289. The Fe-doped films are seen to have coercive forces considerably below the values of 80 and 120 given for the gadolinium-doped films. The dependence of the coercive force on substrate material is attributed to the interaction between stress in the film and the magnetostriction. A typical hysteresis loop which was taken at 6,328 A. and at 77° K. is shown in FIG. 4. One of the most distinguishing features of the loop is its squareness. It has a squareness ratio $M_R/M_S$ of about 0.9 at low temperature and decreases very little even at higher temperatures, e.g., up to 160° K. The coercive force decreases slowly as the temperature increases. For the purposes of comparison a similar hysteresis loop is shown in FIG. 5 for Gd-doped films at 77° K. It is seen in FIG. 5 that the loop for the gadolinium-doped film has lost much of its squareness and has a squareness ratio of less than half that of the Fe-doped film at 77° K.

Figure 6:
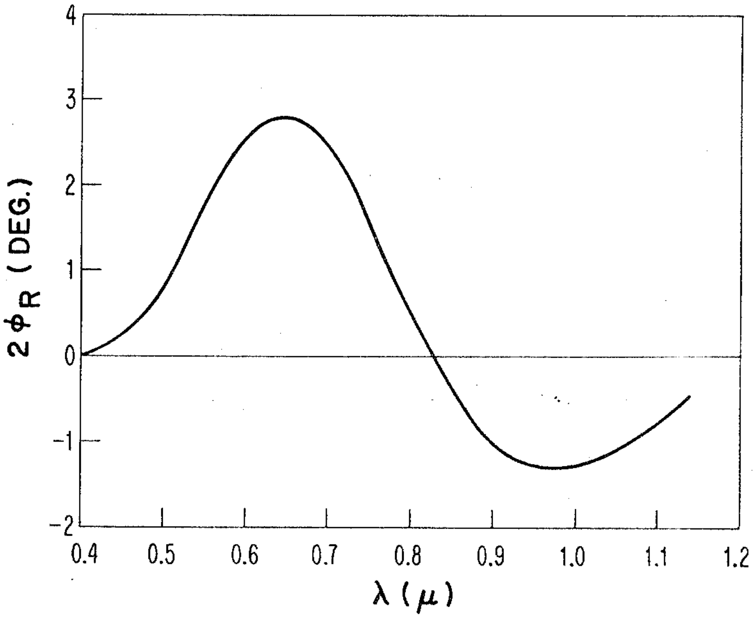
FIG. 6 is a curve depicting the wavelength dependence of longitudinal Faraday rotation in a Fe-doped EuO film at about 9° K.

The magneto-optic Faraday rotations were measured with an incident angle of 70° using a monochromator. The analyzer was set at 8° away from extinction, and consequently the Faraday rotation is almost proportional to the height of the loop (shown in FIG. 4). The wavelength dependence of the remanent longitudinal Faraday rotation measured on a sample containing 7.7 percent of Fe is summarized in FIG. 6. As the wavelength increases, the positive rotation increases to a maximum at about 6,500 A., followed by a decrease to 0 at 8,250 A. where it reverses sign and increases slowly. The peak rotation corresponds to the peak optical absorption and is attributed to an electronic transition from $4f$ to $5d$ levels of $Eu^{++}$ ions. It should be pointed out that the addition of Fe does not alter the wavelength dependence of the Faraday rotation and the optical absorption.

Figure 7A:
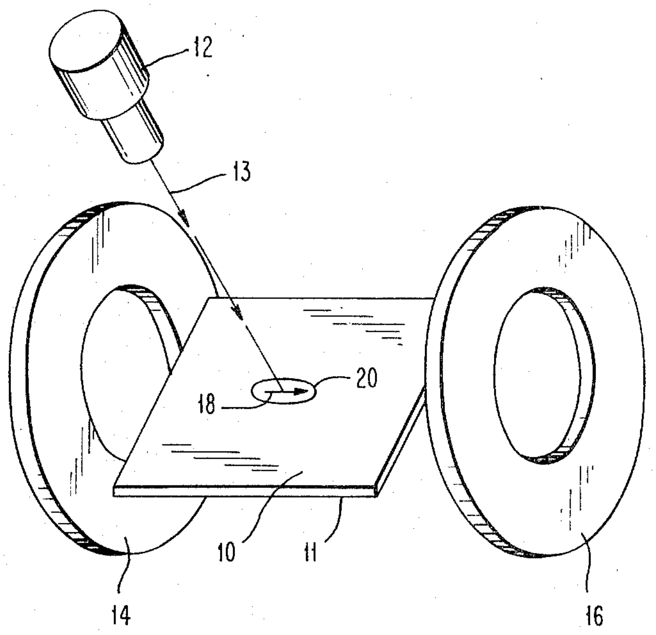
FIG. 7A is a schematic diagram illustrating the writing operation for establishing binary information into a film having magneto-optic and ferromagnetic properties in accordance with this invention.

The beam-addressable memory may be satisfactorily operated using films prepared in accordance with the practice of this invention. Such a beam-addressable memory is presented in the following identified application, Ser. No. 563,553 "Magnetic Recording" filed July 7, 1966 by G. F. Fan, now abandoned, and in copending application, Ser. No. 563,823, now U.S. Pat. No. 3,505,658, "Beam Addressable Memory File" filed July 8, 1966 by G. F. Fan, et al., both applications being assigned to the assignee hereof. The writing operation of a film in a beam-addressable memory is illustrated in FIG. 7A. A film 10 is established on substrate 11. Laser or electron beam source 12 provides focused beam 13 to the upper surface of film 10. A magnetic-field force consisting of Helmholtz coils 14 and 16 establishes a magnetic field 18 in the plane of the film 10 in region 20 thereof. In the presence of a magnetic field of approximately 20 Oersteds, the region 20 in film 10 is established with a magnetic-film direction pointing to the right to indicate binary information of one type, e.g., binary "1" and with the magnetic field pointing to the left indicating binary bit of opposite nature, e.g., binary "0." As the region 20 has a significant higher temperature than the surrounding materials as the result of beam 12, it alone is established with a particular magnetic-field orientation. Upon cooling, region 20 is written with binary information such as FIG. 7A is ready for the reading operation as presented in FIG. 7B. The entire surface of film 10 is established collectively with written binary information. Within the state of the art, a region 20 of 3 microns diameter can readily be established in a selected binary state. Therefore, a film primarily of EuO doped in accordance with this invention has a large capacity of the order of $10^7$ bits/cm.$^2$.

Figure 7B:
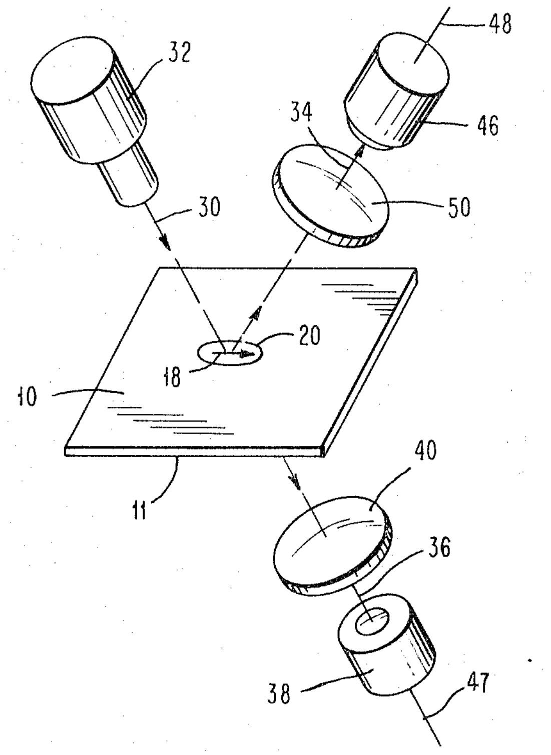
FIG. 7B is a schematic diagram illustrating the reading operation for retrieving information stored as a magnetic orientation via the magneto-optic and ferromagnetic properties in a film in accordance with this invention.

A discussion of the reading operation, i.e., for retrieving binary information, stored in a film 10 as described with FIG. 7A will now be presented with reference to FIG. 7B. In FIG. 7B an Fe-doped film 10 primarily of EuO prepared in accordance with the practice of this invention has incident in region 20 thereof a focused light beam 30, from light beam source 32, preferably a focused laser. Conveniently, the light beam 30 can be provided by He-Ne laser emitting light having wavelengths 6,328 A.

Several magneto-optic effects are readily available for determining the interaction of the incident light beam 30 with magnetized region 20. The result of magnetization 18 therein alters the nature of both reflected light 34 and transmitted light 36 from incident light 30. For measurements of the Faraday rotation, the transmitted light 36 is received by photomultiplier tube 38 via an analyzer 40. The analyzer 40 is set for minimum transmission for a certain direction of the electric field of incident lineally polarized light; and the output on line 47 from photomultiplier tube 38 is the measure of the Faraday rotation.

The longitudinal Kerr effect is measured by photomultiplier tube 46 which provides a measure of the amount of rotation of the polarization after the reflected light 34 from region 20 is passed through the analyzer 50. The transverse effect is measured by the amount of change in the intensity of the reflected light from region 20 as measured by photomultiplier tube 46 in the absence of analyzer 50.

The nature of the magnetic hysteresis loop of a film in a beam-addressable memory is significant for the practical use of the film. There is illustrated in FIG. 4 a hysteresis loop for film 10 at 77° K. The coercive force $H_c$ is the field required to switch the state of magnetization of region 20, i.e., from a binary "1" with the magnetization pointing to the right to a binary "0" with the magnetization pointing to the left. The squareness ratio $M_R/M_S$, i.e., the ratio of the remanent magnetization to the saturation magnetization, is a measure of how well a film will perform in practical terms.

The switching fields $H_c$ of approximately 70 Oersteds from a quartz substrate 11 and approximately 33 Oersteds from glass substrate 11 has been readily obtained for film 10 for writing of binary information by using a dopant specie of selected combinations, selected from the group consisting of Fe, Co, Ni, and Cr. The squareness ratio $M_R/M_S$ of the films primarily of EuO can be varied. For example, a Gd ion with large spin-orbit effects as presented in the literature, when replacing $Eu^{++}$ in the EuO lattice significantly alters the magnetocrystalline anistropy and magnetostriction. As the nature of the hysteresis loop, FIG. 4, is related to both the magnetostriction and the magnetocrystalline anistropy, control of the latter two parameters of a film primarily of EuO controls the squareness ratio.

By the practice of this invention the squareness ratio $M_R/M_S$ can readily be changed. As noted hereinbefore, this is accomplished by selectively doping a host film primarily of EuO with a particular dopant.

What is claimed is:

1. A ferromagnetic article comprising:
   a. a substrate;
   b. a crystalline film being primarily of EuO disposed on said substrate,
   c. at least one dopant uniformly dispersed in said crystalline film selected from the group consisting of Fe, Co, Ni and Cr in atomic relationship to said Eu in the range of about 0.1 percent to about 30 percent by weight.
2. An article according to claim 1 wherein said dopant is Fe.
3. An article according to claim 1 wherein said crystalline film is polycrystalline.
4. An article according to claim 1 wherein said crystalline film is single crystalline.
5. An article according to claim 1 wherein said crystalline film is a thin film having a thickness of about 150 A. to about 100,000 A.
6. An article according to claim 1 wherein said dopant is Fe and said ratio relationship between said dopant and Eu is about 5 percent to about 10 percent by weight.
7. An article according to claim 1 wherein said substrate is quartz.
8. An article according to claim 1 wherein aid substrate is glass.
9. An article according to claim 1 wherein said substrate is polished metal plate.
10. An article having magneto-optic and ferromagnetic properties for mode conversion of incident light according to the magnetic state of the local region upon which the light is incident comprising:
    a. a substrate;
    b. a crystalline film being primarily of EuO disposed on said substrate,
    c. a uniform distribution of at least one dopant selected from the group consisting of Fe, Co, Ni and Cr in said crystalline film on sites normally occupied by Eu atoms and,
    d. said dopant being present relative to said Eu in an atomic ratio relationship in the range of about 0.1 percent to about 30 percent by weight.
11. An article according to claim 10 wherein said dopant is interstitially situated in said crystalline film.
12. An article according to claim 10 wherein said dopant is Fe.

* * * * *